US008429107B2

(12) United States Patent
Denneau et al.

(10) Patent No.: US 8,429,107 B2
(45) Date of Patent: Apr. 23, 2013

(54) SYSTEM FOR ADDRESS-EVENT-REPRESENTATION NETWORK SIMULATION

(75) Inventors: Monty M. Denneau, Yorktown Heights, NY (US); Daniel J. Friedman, Yorktown Heights, NY (US); Ralph Linsker, Yorktown Heights, NY (US); Mark B. Ritter, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/611,968

(22) Filed: Nov. 4, 2009

(65) Prior Publication Data

US 2011/0106741 A1    May 5, 2011

(51) Int. Cl.
*G06F 15/18* (2006.01)
*G06N 3/08* (2006.01)

(52) U.S. Cl.
USPC .......................................................... 706/25

(58) Field of Classification Search ............. 706/25, 706/15, 62
See application file for complete search history.

(56) References Cited

U.S. PATENT DOCUMENTS

| | | | |
|---|---|---|---|
| 4,893,255 A | 1/1990 | Tomlinson, Jr. | |
| 4,974,169 A | 11/1990 | Engel | |
| 5,201,029 A | 4/1993 | Jackson | |
| 5,212,767 A | 5/1993 | Higashino et al. | |
| 5,216,752 A | 6/1993 | Tam | |
| 5,293,458 A | 3/1994 | Chung et al. | |
| 5,323,470 A * | 6/1994 | Kara et al. | 382/103 |
| 5,329,610 A | 7/1994 | Castro | |
| 5,479,579 A | 12/1995 | Duong et al. | |
| 5,550,951 A * | 8/1996 | Woodall | 706/15 |
| 6,405,185 B1 | 6/2002 | Pechanek et al. | |
| 6,496,815 B1 | 12/2002 | Kawashima | |

(Continued)

FOREIGN PATENT DOCUMENTS

| | | |
|---|---|---|
| JP | 01189755 | 7/1989 |
| WO | WO2007071070 | 6/2007 |

OTHER PUBLICATIONS

Linsker, "Neural network learning of optimal Kalman prediction and control", arXiv:0805.4247v1 [cs.NE] May 28, 2008.*
Wang et al, "A behavior controller based on spiking neural networks for mobile robots", Available online Oct. 9, 2007.*

(Continued)

*Primary Examiner* — Jeffrey A Gaffin
*Assistant Examiner* — Ilya Traktovenko
(74) *Attorney, Agent, or Firm* — Cantor Colburn LLP; Vazken Alexanian

(57) ABSTRACT

A system, method, and design structure for address-event-representation network simulation are provided. The system includes a hardware structure with a plurality of interconnected processing modules configured to simulate a plurality of interconnected nodes. To simulate each node, the hardware structure includes a source table configured to receive an input message and identify a weight associated with a source of the input message. The hardware structure also includes state management logic configured to update a node state as a function of the identified weight, and generate an output signal responsive to the updated node state. The hardware structure further includes a target table configured to generate an output message in response to the output signal, identify a target to receive the output message, and transmit the output message. The hardware structure may further include learning logic configured to combine information about input messages and generated output signals, and to update weights.

24 Claims, 8 Drawing Sheets

U.S. PATENT DOCUMENTS

| | | | |
|---|---|---|---|
| 6,502,083 | B1 | 12/2002 | Louis et al. |
| 6,539,368 | B1* | 3/2003 | Chernikov et al. ............. 706/41 |
| 6,754,645 | B2 | 6/2004 | Shi et al. |
| 7,007,002 | B2* | 2/2006 | Matsugu et al. ................ 706/22 |
| 2009/0006296 | A1 | 1/2009 | Chen et al. |

OTHER PUBLICATIONS

Takashi Morie, et al., A Multinanodot Floating-Gate MOSFET Circuit for Spiking Neuron Models, IEEE Transactions on vol. 2, Issue 3, Sep. 2003, pp. 158-164.

David H. Goldberg, Analog VLSI Spiking Neural Network with Address Domain Probabilistic Synapses, Circuits and Systems, 2001, ISCAS 2001, The 2001 IEEE International Symposium on May 6-9, 2001, vol. 3, pp. 241-244.

Joydeep Ghosh, et al., Critical Issues in Mapping Neural Networks on Message-Passing Multicomputers, ACM SIGARCH Computer Architecture News, vol. 16, Issue 2, May 1988, pp. 3-11.

T. Schoenauer, et al., MASPINN: Novel Concepts for a Neuro-Accelerator for Spiking Neural Networks, VIDYNN '98—Workshop on Virtual Intelligence and Dynamic Neural Networks—1998, pp. 22-26.

Yoshihiko Florio, et al., Neuron-Synapse IC Chip-Set for Large-Scale Chaotic Neural Networks, Neural Networks IEEE Transactions on vol. 14, Issue 5, Sep. 2003, pp. 1393-1404.

Yajie Chen, et al., On the Design of a Low Power Compact Spiking Neuron Cell Based on Charge-Coupled Synapses, Neural Networks 2006, IJCNN '06 International Joint Conference on Jul. 16-21, 2006, pp. 1511-1517.

Shih-Chii Liu, et al., Silicon Synaptic Adaptation Mechanisms for Homeostasis and Contrast Gain Control, Neural Networks, IEEE Transactions on vol. 13, Issue 6, Nov. 2002, pp. 1497-1503.

* cited by examiner

SYSTEM FOR ADDRESS-EVENT-REPRESENTATION NETWORK SIMULATION

BACKGROUND

This invention relates generally to network simulation, and more particularly to a system for address-event-representation network simulation.

Network simulations can be used for various modeling applications. Artificial neural networks are one example of a type of network simulation where simple nodes of neurons are connected together to form a network that can exhibit complex global behavior. Neural networks typically operate collectively in parallel.

One type of neural network that increases the level of biological realism of neural simulation, and is also advantageous for hardware implementation, is a spiking neural network (SNN). An SNN can include many processing nodes and interconnections, which in general have specified time delays and modifiable weights. A "spike" or pulse, characterized solely by its time of emission by a source node, is received by its target node and effects changes in the internal state of the targeted node and/or the weight of the interconnection. The targeted node may in turn emit a spike in response to the received spike. The effect of the received spike is related to the weight of the connection along which it arrives, and the recent past history of spikes received by the targeted node. The SNN may adapt over time to perform a desired neural-network function, such as pattern recognition, function approximation, prediction, or control.

Neural network simulation is very slow on general-purpose computers, including those that use parallel processing. For an SNN with N nodes and KN connections, with each node emitting a spike during a fraction f of simulated time steps (sts), the spike being sent to each of its K target nodes, and requiring S computational operations for each received spike at a target node, the computational load is KNfS operations/sts. For typical values of K=100, N=1e6 (a million), f=0.01, and S=30, the resulting KNfS is 3e7 operations/sts. Running on a single processor of a general-purpose computer at 2e9 operations/sec, the network would execute only 70 sts/sec. One run of a typical neural-net algorithm may require training (weight adaptation) on each of 7e4 input patterns, each presented 1e3 times, for a run time of 1e6 sec or about 2 weeks.

SUMMARY

An exemplary embodiment is a system for address-event-representation network simulation. The system includes a hardware structure with a plurality of interconnected processing modules configured to simulate a plurality of interconnected nodes. To simulate each node, the hardware structure includes a source table configured to receive an input message and identify a weight associated with a source of the input message. The hardware structure also includes state management logic configured to update a node state as a function of the identified weight, and generate an output signal responsive to the updated node state. The hardware structure to simulate each node further includes a target table configured to generate an output message in response to the output signal, identify a target to receive the output message, and transmit the output message. The hardware structure may further include learning logic configured to combine information about input messages and generated output signals, and to update weights.

Another exemplary embodiment is a method for address-event-representation network simulation. The method includes receiving an input message at a source table of a node in a hardware structure. The hardware structure includes a plurality of interconnected processing modules configured to simulate a plurality of interconnected nodes. The method also includes identifying a weight associated with a source of the input message, where the identified weight is located in the source table. The method further includes updating a node state as a function of the identified weight, where the updating is performed by state management logic. The method additionally includes generating an output signal responsive to the updated node state, accessing a target table to identify a target to receive an output message, and generating the output message in response to the output signal. The method may further include updating weights as a function of the source and arrival time of input messages and the time of generation of output signals.

Other systems, methods, apparatuses, and/or design structures according to embodiments will be or become apparent to one with skill in the art upon review of the following drawings and detailed description. It is intended that all such additional systems, methods, apparatuses, and/or design structures be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

The invention as described herein provides for address-event-representation (AER) network simulations. An AER system sends messages between interconnected processing modules, wherein each message indicates an event occurrence and one or more addresses identifying the source and/or target of the message. An "AER network simulation" refers to a simulation of a network by an AER system. One type of network that can be simulated using an AER system is a spiking neural network (SNN). In an SNN, each "spike" or pulse of activity is sent from one node (or "neuron") to another, and the emission and arrival times of spikes are used to perform computations. Thus, if a node i of an SNN sends a spike to a node j, the AER message may indicate that the source of the message is node i, which enables node j to determine an appropriate response. Implementing the AER network simulation in hardware allows large-scale simulations to rapidly exchange messages among many nodes in a nearly-simultaneous manner, to closely approximate the actual behavior of the network being simulated.

The term "node" is used herein in two related but different senses: (a) as a node of the network (e.g., an SNN) that is being simulated; and (b) as the portion of the hardware that handles the processing for the simulation of a node of the network that is being simulated. Thus, for example, in referring to the emission of a spike by a node, to the point-to-point connections from one node to another (as in FIG. 2), etc., all such references are to a node of the network being simulated. As a further example, references to a source table, a target table, a shift register, an input 'spike' or 'expire' message, an output message, etc. of a node refer to the portion of the hardware that handles the processing for the simulation of the node of the network, as described in greater detail in reference to FIGS. 3-6.

Figure 1:
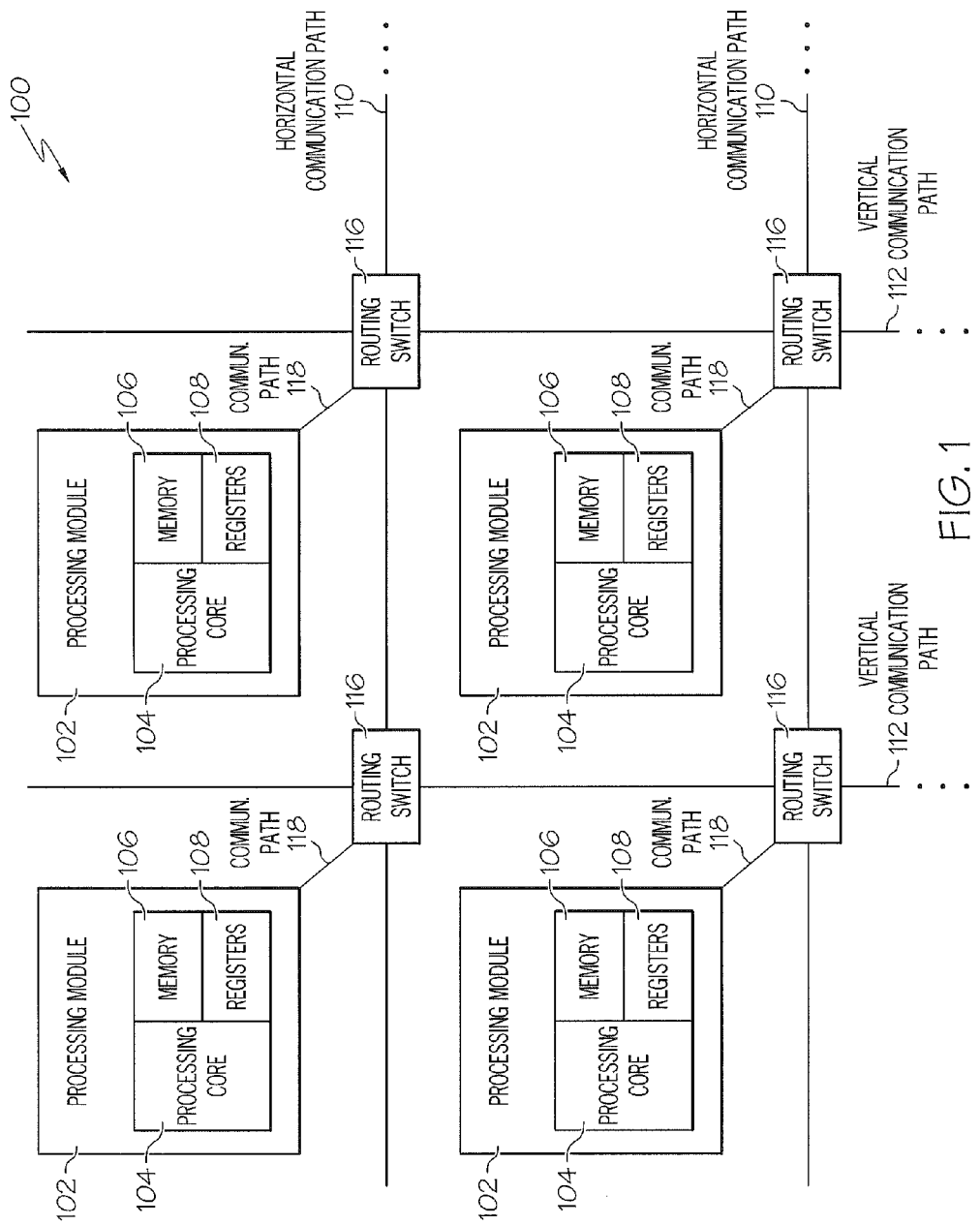
FIG. 1 depicts a system for address-event-representation network simulation that may be implemented in exemplary embodiments.

FIG. 1 depicts an example of a system 100 for address-event-representation network simulation. The system 100 includes multiple processing modules 102 that are interconnected in a mesh topology. Each processing module 102 includes a processing core 104, memory 106, and registers 108. Horizontal communication paths 110 and vertical communication paths 112 intersect at routing switches 116. Each processing module 102 may be connected to a routing switch 116 via a communication path 118. Although depicted as a 2-dimensional structure, the processing modules 102 may also support 3-dimensional structures to reduce the footprint associated with the system 100 and shorten path lengths.

In one embodiment, each processing module 102 is configurable to function as a node (in sense (b) above) for network simulation. In an alternate embodiment, each processing module 102 manages processing for a group of nodes for network simulation. Combining the memory for each node in a group into one physical memory unit (e.g., an SRAM array) can enhance efficiency for hardware implementation and performance. Additionally, during the time that the system simulates one "simulation time step," many electronic cycles may have elapsed. The hardware may be multiplexed or "time-sliced" into multiple portions per simulation time step, so that some of the same hardware within a processing module can serve for the simulation of multiple nodes during a single simulation time step, thus making more efficient use of processing hardware.

The system 100 can be integrated in a single package or distributed between multiple physical devices. The system 100 also includes support structures known in the art, such as one or more clocks, power supplies, I/O interfaces, communication interfaces, and the like. The system 100 is scaleable to support a wide variety of network simulation topologies. While only a limited number of processing modules 102, routing switches 116, and communication paths 110, 112, and 118 are depicted in FIG. 1, the AER system may support the sending of messages among a very large number of processing modules, and thereby support a very large number of connections among nodes of the network being simulated. The network being simulated can have a large number of connections between arbitrary pairs of nodes. The messages representing the activity of the simulated network can be handled by the communication paths 110 and 112, which are multi-signal busses. A large number of connections may be managed by resource arbitration, where the time scale of the system 100 is significantly faster than the time scale of the network being simulated.

In one embodiment, communication between processing modules 102 occurs between nearest neighbor routing switches 116 as one hop at a time to propagate messages through the system 100. In this case, communication between two arbitrary processing modules proceeds using a mesh network; multiple hops along the mesh network may be used; and off-chip or off-package communication may be used if the two processing modules are located on different chips or different packages, respectively. Routing switches 116 control message distribution between processing modules 102. Alternatively, two or more mesh networks at different spatial scales may be used to implement the system 100, so that long-range on-chip communication can proceed in larger steps than those of a nearest-neighbor mesh. Messages can be sent as packets using an address-event representation. Communication links in the system 100 may be implemented using high-speed serial links having bandwidth of, for instance, about 10 Gb/sec between processing modules 102 and/or external circuitry.

Figure 2:
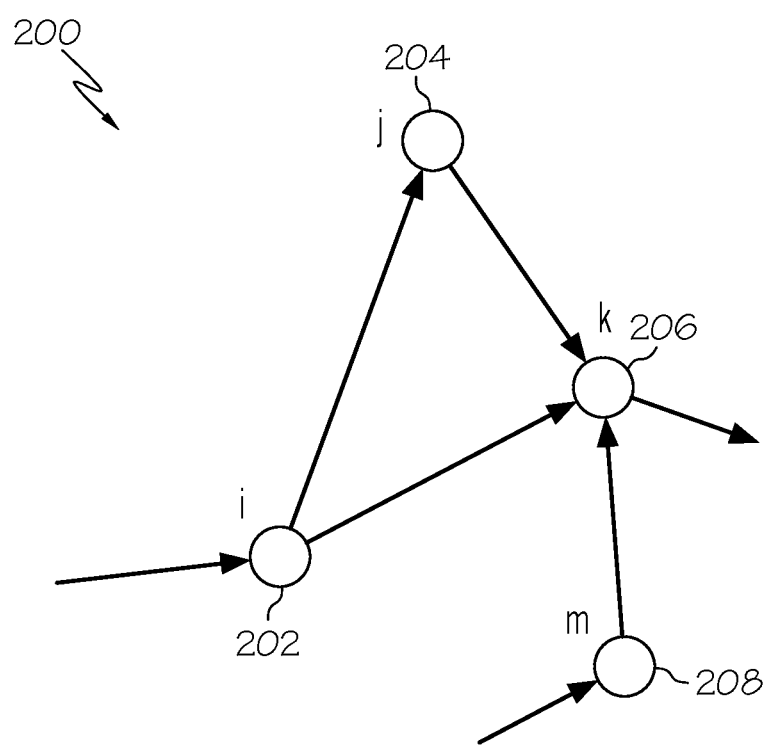
FIG. 2 depicts an example of a network simulation that may be implemented in exemplary embodiments.

FIG. 2 depicts an example of a network simulation 200 that may be implemented in exemplary embodiments. The network simulation 200 includes node i 202, node j 204, node k 206, and node m 208. Node i 202 can send output messages to nodes j 204 and k 206. Node j 204 can receive input messages from node i 202 and send output messages to node k 206. Node m 208 can also send output messages to node k 206. Node k 206 receives input messages from nodes i 202, j 204, and m 208, and can send output messages to another node (not depicted). The nodes i 202-m 208 may be simulated in separate processing modules 102 of FIG. 1, or combined in one or more of the processing modules 102 depending upon the timing and processing constraints associated with the system 100 and the simulated network 200. The simulated network 200 represents a simple example of a portion of a larger network. For example, the nodes 202-m 208 can each connect to one hundred or more other nodes (not depicted).

Figure 3:
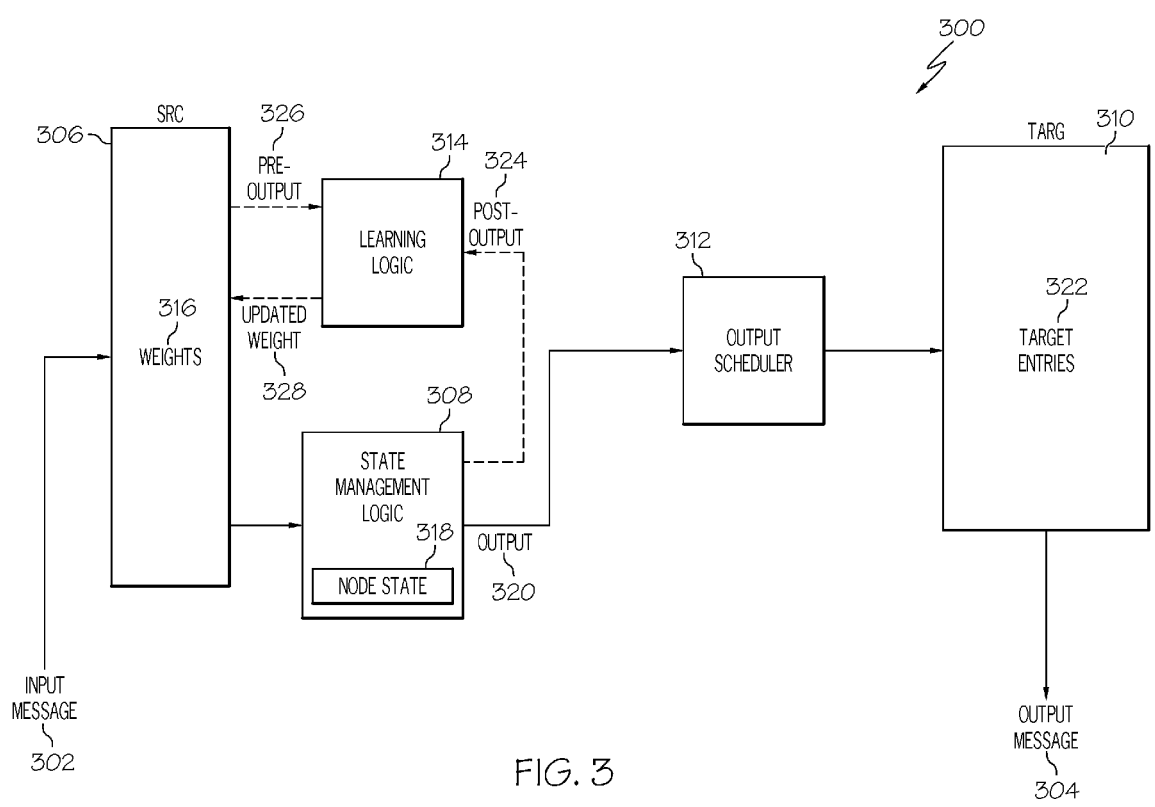
FIG. 3 depicts an example of network node logic and storage that may be implemented in exemplary embodiments.

FIG. 3 depicts network node logic and storage for a node 300 that may be implemented in exemplary embodiments. Node 300 represents one embodiment of node j 204 of FIG. 2. Node 300 is configured to receive an input message 302 and to transmit an output message 304. In relation to FIG. 2, the input message 302 is received from node i 202, and the output message 304 is transmitted to node k 206. Node 300 includes a node processing and storage architecture to implement any node in the simulated network 200 of FIG. 2. Node 300 includes a source table 306, state management logic 308, and a target table 310. The node 300 may also include an output scheduler 312 and learning logic 314.

In exemplary embodiments, the source table 306 is configured to receive input message 302 and identify a weight associated with a source of the input message 302. For instance, if the source of the input message 302 is node i 202, the input message 302 may include an index or pointer into the source table 306 that is associated with node 202. Alternatively, a translation can be performed if the format of the input message 302 does not map directly to an entry or row of the source table 306. The source table 306 holds weights 316 that indicate an amount to increase or decrease a node state 318. The weights 316 can be positive or negative numbers. While the term "weight" arises in the field of neural networks, weight is used more generally herein, in the context of a general network that is being simulated, to refer to one or more parameters that are associated with a connection from a source node to a target node, with the source node, and/or with the target node. At least some of these parameters may be updated by a learning process during network operation.

The state management logic 308 updates the node state 318 as a function of the identified weight from the source table 306. For example, the node state 318 can be an internal variable (somewhat analogous to the membrane voltage or potential difference in a biological neuron) that is increased or decreased by the weight associated with the input message 302. The state management logic 308 may incrementally reduce the value of the node state 318 between input messages 302 to simulate decay when modeling neurons. The state management logic 308 generates an output signal 320 responsive to an update of the node state 318. The output signal 320 may be generated when the value of the node state 318 exceeds a threshold value, which in turn resets the node state 318.

The target table 310 is configured to generate output message 304 in response to the output signal 320. The target table 310 is further configured to identify a target to receive the output message 304, and transmit the output message 304. The target table 310 may include addresses of other nodes configured to receive the output message 304, such as the address of node k 206 of FIG. 2. The target table 310 can also include information about time delays for sending the output message 304. Time delays can be used to simulate transport delays between nodes of the simulated network. Therefore, if nodes j 204 and k 206 of FIG. 2 are modeled elements, such as neurons, with different modeled path lengths with respect to node i 202, the target table 310 for node i 202 can include different time delays in target entries 322 associated with nodes j 204 and k 206.

The timing of output message 304 may be scheduled using the output scheduler 312. In one embodiment, the output scheduler 312 receives the output signal 320 from the state management logic 308, reads the target table 310 to determine a delay time, and delays the output signal 320 for the determined delay time before triggering the target table 310 to send the output message 304. The output message 304 can include address information about the source node and target node, such as identifying node j 204 as the source and node k 206 as the target. When the output message 304 is transmitted and routed, the target information may be removed from the output message 304 and used for message routing purposes, while delivering source information as an input message 302 to the target node. For an SNN, the input message 302 can model a received spike and the output message 304 can model an emitted spike.

The node 300 may also include learning logic 314 to actively adjust weights 316 in the source table 306. When the output signal 320 is generated by the state management logic 308, a notification is sent to the learning logic 314 as post-output signal 324. In response to the notification, the learning logic 314 sets a post-output state value that represents the time at which the output signal 320 was generated. The post-output state value in the learning logic 314 is held for a time $L_-$ ("L sub minus") after the output signal 320 is generated. If multiple output signals 320 are generated by node 300 during the time $L_-$, information about each of the output signals 320 can be held at the learning logic 314 for time $L_-$.

When input message 302 arrives at the source table 306 of node 300, information is stored that references the source node (e.g., node i 202), and optionally the time (or time interval) during which the input message 302 arrived. A pre-output signal 326 can be sent to the learning logic 314 in response to receiving the input message 302. (The terms "post-output signal" and "pre-output signal" are used herein by analogy to the post-synaptic and pre-synaptic activity signals, respectively, at a synaptic connection of a biological neuron.) If the pre-output signal 326 is received at the learning logic 314 while a post-output state is held at the learning logic 314, then the learning logic 314 computes an updated weight 328 corresponding to the source node. The updated weight 328 is computed as a function of the time interval between the arrival time of the input message 302 and the generation of the output signal 320 by the state management logic 308. The updated weight 328 may correspond to a reduction in the algebraic value of the weight when the post-output signal 324 precedes the pre-output signal 326.

In exemplary embodiments, when a post-output signal 324 is received at the learning logic 314, the learning logic 314 interrogates the source table 306 to see which (if any) nodes have sent a message that was received at node 300 within the past $L_+$ ("L sub plus") time steps. In response to determining that a message has been received, the learning logic 314 computes updated weight 328 as a function of the current weight and the time interval between the arrival time of the message and the time that the output signal 320 was generated by the node 300. The updated weight 328 may correspond to an increase in the algebraic value of the weight, when the post-output signal 324 follows the pre-output signal 326.

Figure 4:
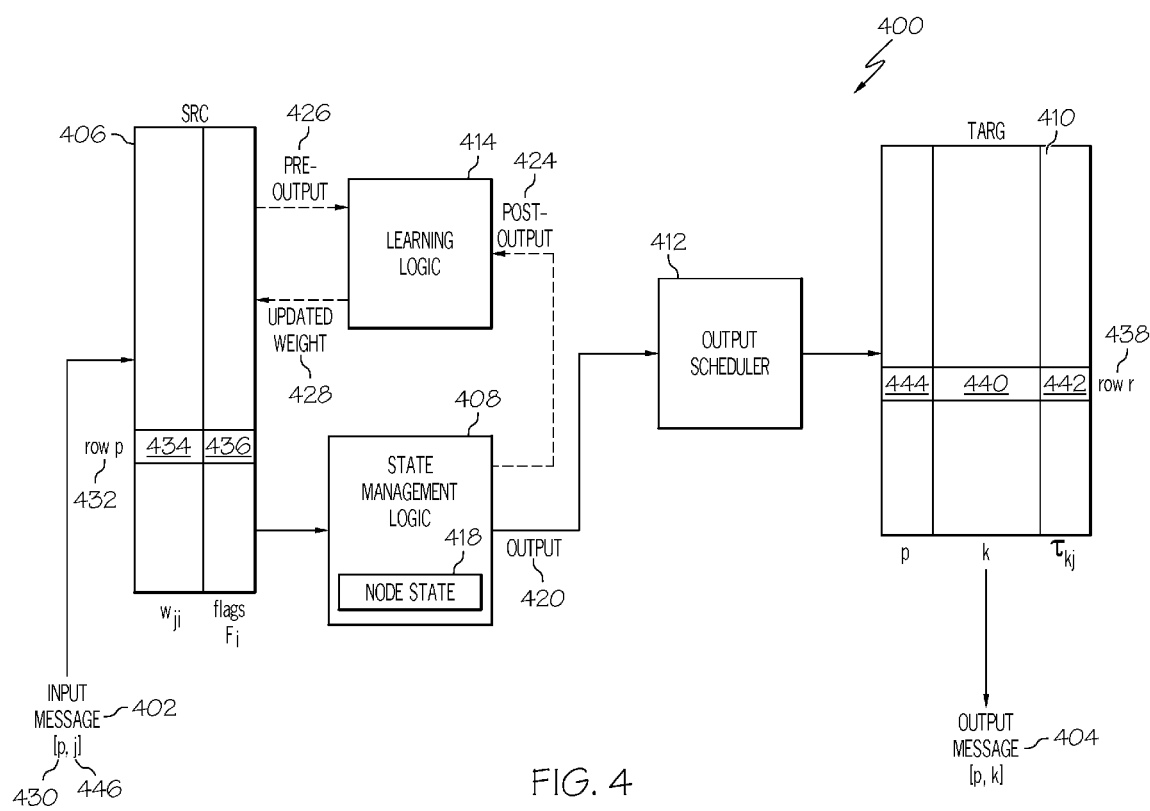
FIG. 4 depicts another example of network node logic and storage that may be implemented in exemplary embodiments.

FIG. 4 depicts another example of network node logic and storage that may be implemented in exemplary embodiments. Node 400 of FIG. 4 is an alternate embodiment of the node 300 of FIG. 3. Similar to node 300 of FIG. 3, node 400 of FIG. 4 receives input message 402, sends output message 404 and includes a source table 406, state management logic 408, target table 410, output scheduler 412, learning logic 414, and node state 418. Also similar to node 300 of FIG. 3, the state management logic 408 generates output signal 420, and the learning logic 414 receives post-output signal 424 and pre-output signal 426 in addition to writing updated weights 428 to source table 406.

In the embodiment of FIG. 4, the input message 402 includes an entry indicator p 430 that denotes an entry of source table 406 to which the input message 402 corresponds. The entry indicator p 430 serves as an identifier of a source node i that sent the input message 402 to the node 400. The source table 406 includes entries assigned for each source node that is connected to node 400. Each entry in the source table 406 may map to a row in the source table 406. The one-to-one mapping is referred to by functions p(i) and i(p). A row p 432 of source table 406 may store weight $w_{ji}$ 434 and one or more flag bits Fi 436, where weight $w_{ji}$ 434 represents the weight associated with the connection from node i 202 to node j 204 of FIG. 2. In this example, the one or more flag bits Fi 436 store information about the time of arrival of a recent input message 402 from node i 202 at node j 204, which is used by learning logic 414.

In an exemplary embodiment, the target table 410 has a row r 438 for each target node that node 400 is connected to. In this example, node 400 is an embodiment of node j 204 targeting node k 206 of FIG. 2. Row r 438 can include the address k 440 of node k 206 (the target node), a time delay $\tau_{kj}$ 442 from node j 204 to node k 206, and a pointer p' 444 such that node j 204 is represented in row p' of the source table of node k 206. The output message 404 is emitted according to the time delay $\tau_{kj}$ 442 as scheduled by the output scheduler 412. The output message 404 may include pointer p' 444 and address k 440. In this embodiment, the pair of nodes j 204 and k 206 plays the same role with regard to the output message 404 that the pair of nodes i 202 and j 204 played with regard to the input message 402, where address j 446 in the input message 402 represents a target address from the source node sending the input message 402.

In an alternative embodiment, the target table 410 uses a "bucket" representation to store the pointer p' 444 and address k 440 pairs corresponding to each value of time delay τ. Using a bucket approach may be efficient when there are relatively few unique time delay τ values. The use of buckets can save time searching the target table 410, at the cost of potentially requiring a greater storage allocation for target table 410.

In an exemplary embodiment, the time delay $\tau_{kj}$ from node j to node k of the simulated network is programmably set at the beginning of the simulation (i.e., when the connectivity of the network is specified), and thereafter fixed for the duration of the simulation. In an alternative embodiment, the time delay is set at the beginning of the simulation, and thereafter modified using a learning rule, in accordance with the learning algorithm being used. In the case that the modification of the value of $\tau_{kj}$ depends only on information available in the processing module that handles processing for node j, then the learning logic for node j may update the value of $\tau_{kj}$ in the target table for node j.

Figure 5:
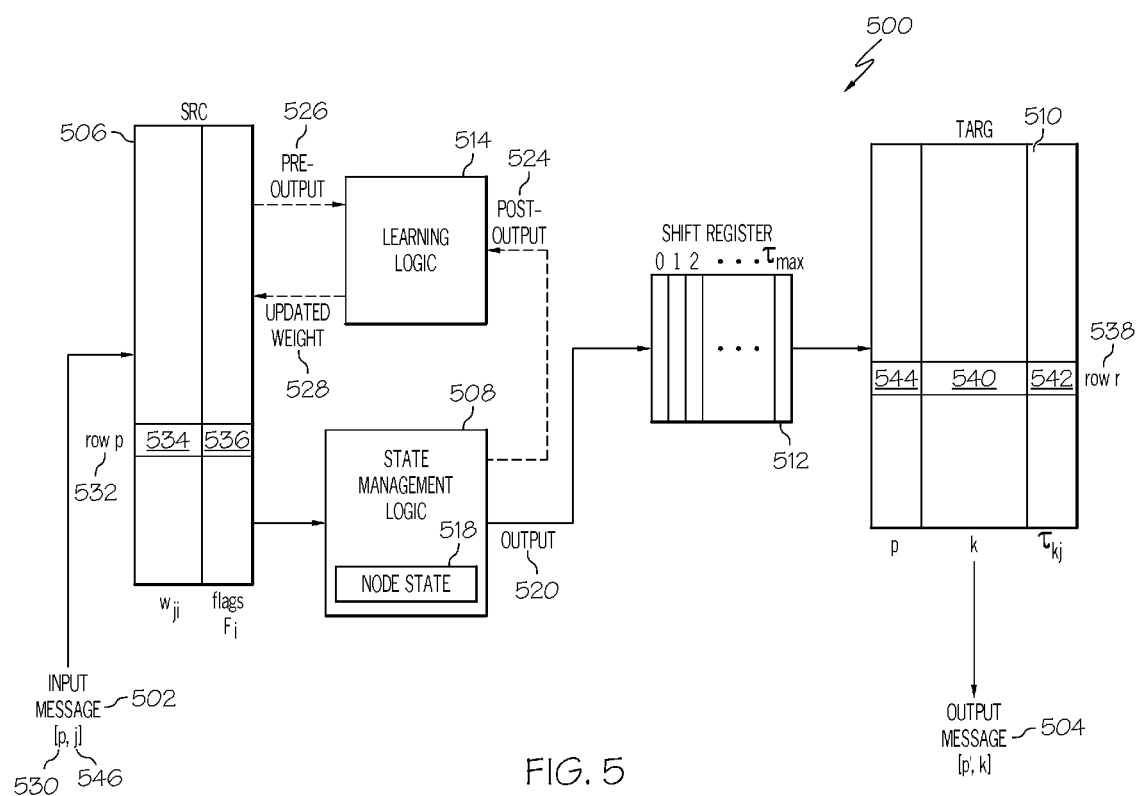
FIG. 5 depicts a further example of network node logic and storage that may be implemented in exemplary embodiments.

FIG. 5 depicts another example of network node logic and storage that may be implemented in exemplary embodiments. Node 500 of FIG. 5 is an alternate embodiment of the node 400 of FIG. 4. Similar to node 400 of FIG. 4, node 500 of FIG. 5 receives input message 502, sends output message 504 and includes a source table 506, state management logic 508, target table 510, learning logic 514, and node state 518. Also similar to node 400 of FIG. 4, the statement management logic 508 generates output signal 520, and the learning logic 514 receives post-output signal 524 and pre-output signal 526 in addition to writing updated weights 528 to source table 506. Node 500 also receives entry indicator p 530 and address j 546 in the input message 502. Again, similar to node 400 of FIG. 4, the source table 506 includes row p 532 storing weight $w_{ji}$ 534 and one or more flag bits Fi 536. The target table 510 may include row r 538 with address k 540 of node k 206 (the target node), a time delay $\tau_{kj}$ 542 from node j 204 to node k 206, and a pointer p' 544 such that node j 204 is represented in row p' of the source table of node k 206.

In the embodiment of node 500 depicted in FIG. 5, output scheduler 412 of FIG. 4 is implemented as shift register 512. The shift register 512 can be implemented in the registers 108 of FIG. 1. The shift register 512 may include one column or location for each possible value τ of time delay $\tau_{kj}$ 542. The contents of the shift register 512 can be initialized as all zeros. When the state management logic 508 generates output signal 520, a '1' is placed in column 0 of the shift register 512 as an indicator of the output signal 520. At each time step, the contents of shift register 512 are advanced one location or column to the right. At each time step, the shift register 512 may be interrogated. In response to detecting a '1' in location τ, each row r 538 having time delay $\tau_{kj}$ 542 equal to τ generates output message 404. Alternatively, pointer p' 544 and address k 540 pair in τ buckets of the target table 510 can be used to generate output message 404 instead of row r 538 if bucket-based organization is used for the target table 510.

The learning logic 514 can use information about the time interval between the pre- and post-output signals 526 and 524 and to perform weight adjustments. In this case, Fi 536 includes multiple flag bits (indexed by b=0, 1, . . . ) in the row p 532 of source table 506. For example, Fi may be initialized to all '0' bits. When input message 502 from node i 202 arrives at node j 204 at time step t, and there are M flag bits for each row of the source table 506, then a '1' can be placed at the b'th flag bit of Fi 536, where b=floor[(t mod $L_+$)/M]. This indicates that input message 502 arrived during time bin b. Storing bin information allows the learning logic 514 to know the approximate time interval between input message 502 arrival and output signal 520 generation by node j 204. For the reverse case in which post-output signal 524 precedes pre-output signal 526 arrival from node i 202, the learning logic 514 can use the exact values of the emission and arrival times. Whenever the time step advances into time bin b, the b'th flag bit of every row of the source table 506 is reset to zero. This is because a time of approximately $L_+$ has elapsed since a '1' was most recently stored in the b'th flag bit, and the earlier-arrived signal is no longer used for generating the updated weight 528.

An alternate approach to using time bins is provided in the following example, where, $L_+$ is a "pre before post" learning time window, defined to mean that when a pre-output signal 526 arrives at node j 204 between ($L_+$−1) and 1 time unit (inclusive) before node j 204 fires post-output signal 524, that "pre/post" pair is used for weight modification by the learning logic 514. Assuming that node 500 is used to implement a node of simulated network 200 of FIG. 2 as an SNN, the messages between nodes represent spikes and the nodes represent neurons. M time bins are denoted 0, 1, . . . , (M−1), where each bin m corresponds (in ascending order) to a programmable time interval in u. The value u is defined to be a "modular time" equal to [t mod($L_+$)], and the set of bins m spans all such time values. The value of m corresponding to a given value of u is denoted m(u). Time is kept by each neuron in this modular form—analogous to a clock that counts from 0 to ($L_+$−1) and then repeats from 0. When neuron j 204 reaches modular time u, where u is the first u-value corresponding to bin m, all bits of column m in source table 506 are reset to 0. Whenever a spike arrives at neuron j 204 from neuron i 202 (at modular time u'), the flag bit in [row p(i), column m(u')] of the flag-bits section of source table 506 is set to 1. When a spike is emitted by neuron j 204, at modular time u", all bins of source table 506 are scanned, and for each '1' bit in [row p(i), col m'], $w_{ji}$ is updated by f($w_{ji}$, m', u"). The values of the function f may be pre-stored as a table or computed. The function f need not depend on the current weight value. The computation (or retrieval) of the value of f can be performed in the learning logic block 514.

Continuing with a numerical example, let $L_+$=20 and M=4. The bins may be defined such that bin 0 corresponds to modular time u=0, 1, . . . , 4; bin 1 to time u=5, . . . , 9; bin 2 to time u=10, . . . , 14; and bin 3 to time u=15, . . . , 19. In general, the intervals need not all be of the same size. Further assume that a spike arrives at neuron j 204 from neuron i 202 at modular time u'=13. This causes a '1' bit to be placed in bin 2. Next assume that neuron j 204 fires a spike 6 time steps later, at modular time u"=19. The learning logic 514 scans the source table 506, finds the '1' bit in the row corresponding to neuron i 202, and thereby knows that the pre-to-post time difference is in the range from (19−10)=9 to (19−14)=5 inclusive, which includes the actual value of 6. The learning logic 514 causes the weight $w_{ji}$ to be changed by a programmable value f($w_{ji}$, m'=2, u"=19).

To continue the example, if neuron j 204 fired instead 10 time units after neuron j 204 received the spike from neuron i 202, i.e., at u"=13+10−20=3, the '1' bit would again be found, and the weight would be changed by f($w_{ji}$, m'=2, u"=3). The learning logic 514 would know that the pre-post time difference is in the range from (3−10+20)=13 to (3−14+20)=9 inclusive, which includes 10. The "+20" is added because (3−10) and (3−14) are negative, and modular arithmetic prescribes that the modular base ($L_+$ or, here, 20) be added to yield a result between 0 and ($L_+$−1).

Assume instead that neuron j 204 fired 25 time units after receiving the spike from neuron i 202, i.e., at a modular time of u"=13+25−20=18. When the modular time reaches 10, all the bits of column 2 of the flag-bits section of source table 506 are reset to 0. Thus when neuron j 204 fires, it is not paired with a spike from neuron i 202 that arrived more than approximately 20 time steps earlier. To preserve information about two or more spikes, multiple entries in the source table 506 can be used. This can be accomplished by placing '1' bits in two or more bins, provided that no more than one spike per time bin needs to be stored.

Figure 6:
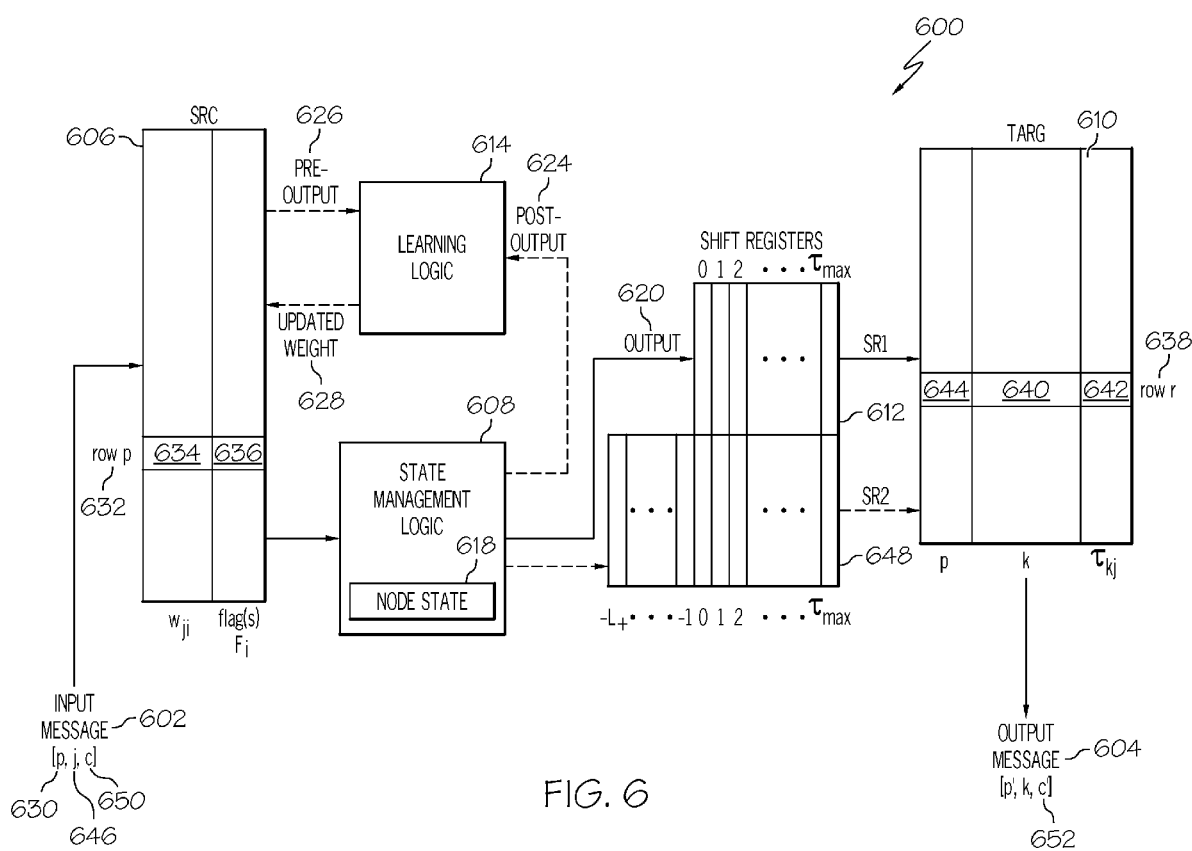
FIG. 6 depicts an additional example of network node logic and storage that may be implemented in exemplary embodiments.

FIG. 6 depicts another example of network node logic and storage that may be implemented in exemplary embodiments. Node 600 of FIG. 6 is an alternate embodiment of the node 500 of FIG. 5. Similar to node 500 of FIG. 5, node 600 of FIG. 6 receives input message 602, sends output message 604 and includes a source table 606, state management logic 608, target table 610, shift register 612, learning logic 614, and node state 618. Also similar to node 500 of FIG. 5, the state management logic 608 generates output signal 620, and the learning logic 614 receives post-output signal 624 and pre-output signal 626 in addition to writing updated weights 628 to source table 606. Node 600 also receives entry indicator p 630 and address j 646 in the input message 602. Again, similar to node 500 of FIG. 5, the source table 606 includes row p 632 storing weight $w_{ji}$ 634 and one or more flag bits Fi 636. The target table 610 may include row r 638 with address k 640 of node k 606 (the target node), a time delay $\tau_{kj}$ 642 from node j 204 to node k 206, and a pointer p' 644 such that node j 204 is represented in row p' of the source table of node k 206.

In the example of node 600, the learning logic 614 monitors the order in which the pre- and post-output signals 626 and 624 arrive within a learning time window L. Node 600 includes a second shift register 648 between the state management logic 608 and target table 610. The node 600 also augments the input message 602 and output message 604 with one or more control bits denoted by c 650 in the input message 602 and by c' 652 in the output message 604. The multiple flag bits Fi 536 of FIG. 5 may be replaced a single flag bit Fi 636 per entry in source table 606. The flag bit Fi 636 is turned on when input message 602 is received with c 650 indicating a simulation event, such as a received simulated spike. The flag bit Fi 636 is turned off when input message 602 is received with c 650 indicating an expire event, which may correspond to the arrival of a second message emitted by node i 202 and sent to node j 204 at a time $L_+$ units after the simulation event message. The shift registers 612 and 648 enable independent scheduling of sending the simulation event and the expire event.

In the embodiment of FIG. 6, the source node keeps track of the time interval during which a simulation event message that has arrived at its target should be eligible for contributing to the updating of the weight of the corresponding connection. As a further example, consider a spike as the simulation event emitted by node j 204 to a node k 206 in the network simulation 200 of FIG. 2. The state management logic 608 places a '1' bit in column 0 of shift register 612, and a '1' bit in column "$-L_+$" of shift register 648. Each shift register 612 and 648 advances by one to the right at each time step. At time $\tau$ following the emission of a spike by node j 204, output message 604 is sent to node k 206 indicating a spike event, e.g., [p',k,'SPIKE']. This turns on the single flag bit of row p'(j) in the source table of node k 206, making the spike eligible to contribute to updating of $w_{kj}$. A time $L_+$ steps later, another output message 604 with an "expire" event is sent to node k 206, e.g., [p',k,'EXPIRE']. The expire event turns off the flag bit in the source table of node k 206, making the spike no longer eligible to contribute to the updating of $w_{kj}$. The cost of this alternative is that twice the message packet traffic is required when learning is active; however, fewer flag bits are saved in the source table 606.

There can be ambiguity when two or more spikes from the same node i 202 both arrive at node j 204 less than $L_+$ time steps before node j 204 fires a spike. Depending on the algorithm implemented in the learning logic 614, the ambiguity may or may not need to be resolved. To preserve information about two or more such "pre" spikes, multiple entries in the source table 606 can be used. Adding one or more columns to the flag-bit section of the source table 606, e.g., one column for each "spike index", and adding to the control portion of each "SPIKE" and its corresponding "EXPIRE" message, can enable handing of multiple spikes within the same learning window. The spike index identifies which i-to-j spike a message refers to. In order to store up to Q spikes from node i 202 to node j 204 arriving within $L_+$ time steps of each other, there should be Q distinct spike index values. The learning algorithm being implemented by the learning logic 614 may be tolerant of dropped or inexactly timed spikes, so that storage of exact information (e.g., all spike-pairs, or the exact time of spike arrival) may not generally be required. There is thus a tradeoff between hardware or bandwidth requirements and the precision with which spike information is handled.

For some network simulation applications, it may be desirable to have the weight represent not the amount that an incoming spike should contribute toward the node state of the neuron j 204, but instead the probability of a given spike along a connection path being received. To accomplish this, control logic can be added to nodes 300-600 of FIGS. 3-6 to determine whether an incoming message is processed further or ignored. For an incoming message from source node i 202, the magnitude of weight $w_{ji}$ stored in the source table can be used to generate a probability value. A random number generator is used to produce a random value, which is compared with the probability value. The result of the comparison determines whether the incoming message is processed or ignored. Additionally, the state management logic and the learning logic can treat the weight $w_{ji}$ as if it were +1 or −1, instead of using the absolute magnitude of $w_{ji}$.

The control logic can be integrated in source tables 306, 406, 506 and/or 606, or may be implemented as separate logic interposed between the input message and the source tables. The control logic can fetch the weight from the source table, generate a random number, determine whether or not an incoming spike is to be accepted by node j 204, and thereby gate whether the spike is either enrolled into the source table or ignored.

Figure 7:
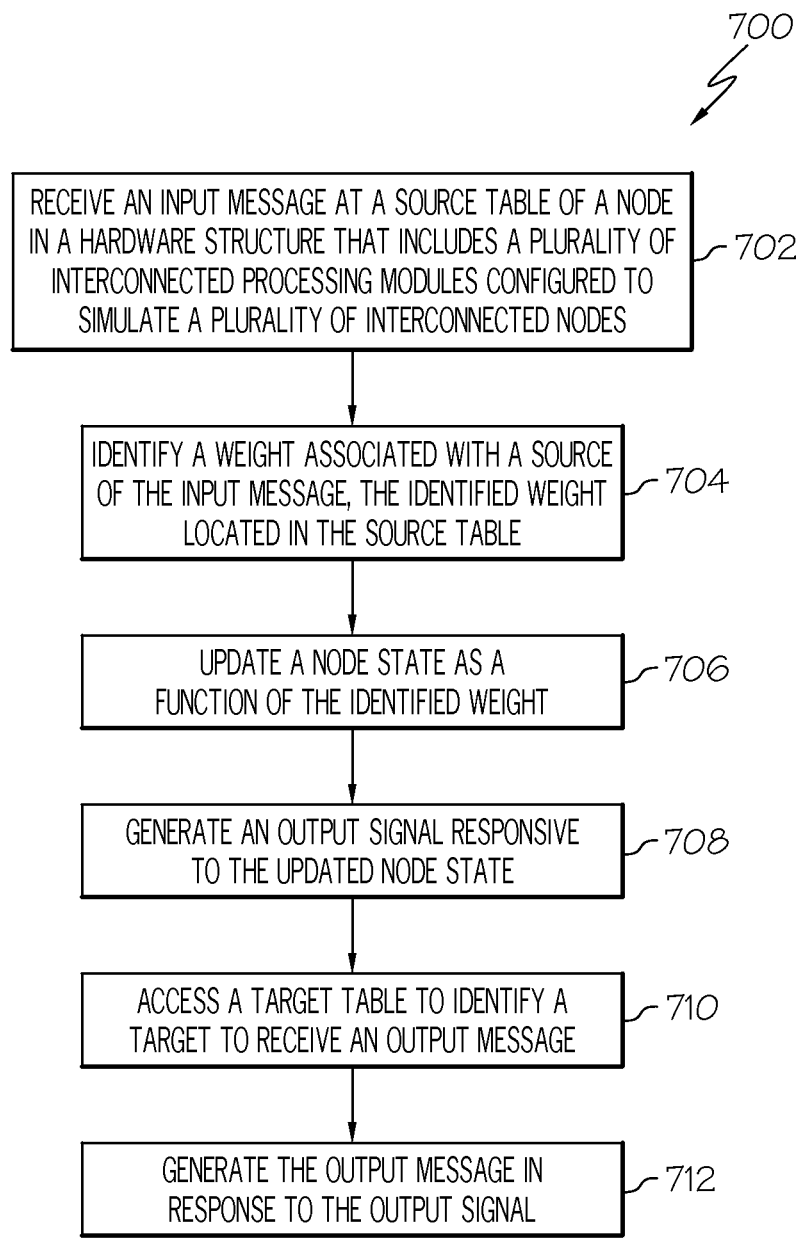
FIG. 7 depicts an example of a process for address-event-representation network simulation that may be implemented in exemplary embodiments.

FIG. 7 depicts an example of a process 700 for address-event-representation network simulation. In exemplary embodiments, address-event-representation network simulation is performed on the system 100 of FIG. 1 using one or more of the nodes 300-600 of FIGS. 3-6. As previously described, the system 100 is a hardware structure that includes a plurality of interconnected processing modules 102 configured to simulate a plurality of interconnected nodes. For purposes of explanation, the process 700 is described in reference to node 300 of FIG. 3, although the process 700 can be implemented in nodes 400, 500, and 600 of FIGS. 4-6.

At block 702, input message 302 is received at a source table 306 of node 300. At block 704, a weight associated with a source of the input message 302 is identified, where the identified weight is located in the weights 316 of the source table 306. The source may be node i 202 of FIG. 2, if node 300 represents node j 204 of FIG. 2. At block 706, the state management logic 308 updates node state 318 as a function of the identified weight. The identified weight can be used to directly modify the node state 318 or represent a probability of allowing the update of the node state 318 to occur. At block 708, the state management logic 308 generates an output signal 320 responsive to the update of node state 318. At block 710, target table 310 is accessed to identify the target to receive output message 304, such as node k 206 of FIG. 2.

At block 712, the output message 304 is generated in response to the output signal 320. The node 300 can use output scheduler 312 to delay sending the output message 304, where the output scheduler 312 receives the output signal 320 from the state management logic 308. The output scheduler 312 can read the target table 310 to determine a delay time, and the output scheduler 312 delays the output signal 320 for the determined delay time before sending the output signal 320 to the target table 310 to trigger transmission of the output message 304. In some embodiments, the output scheduler 312 is implemented in one or more shift registers as depicted in FIGS. 5 and 6.

Figure 8:
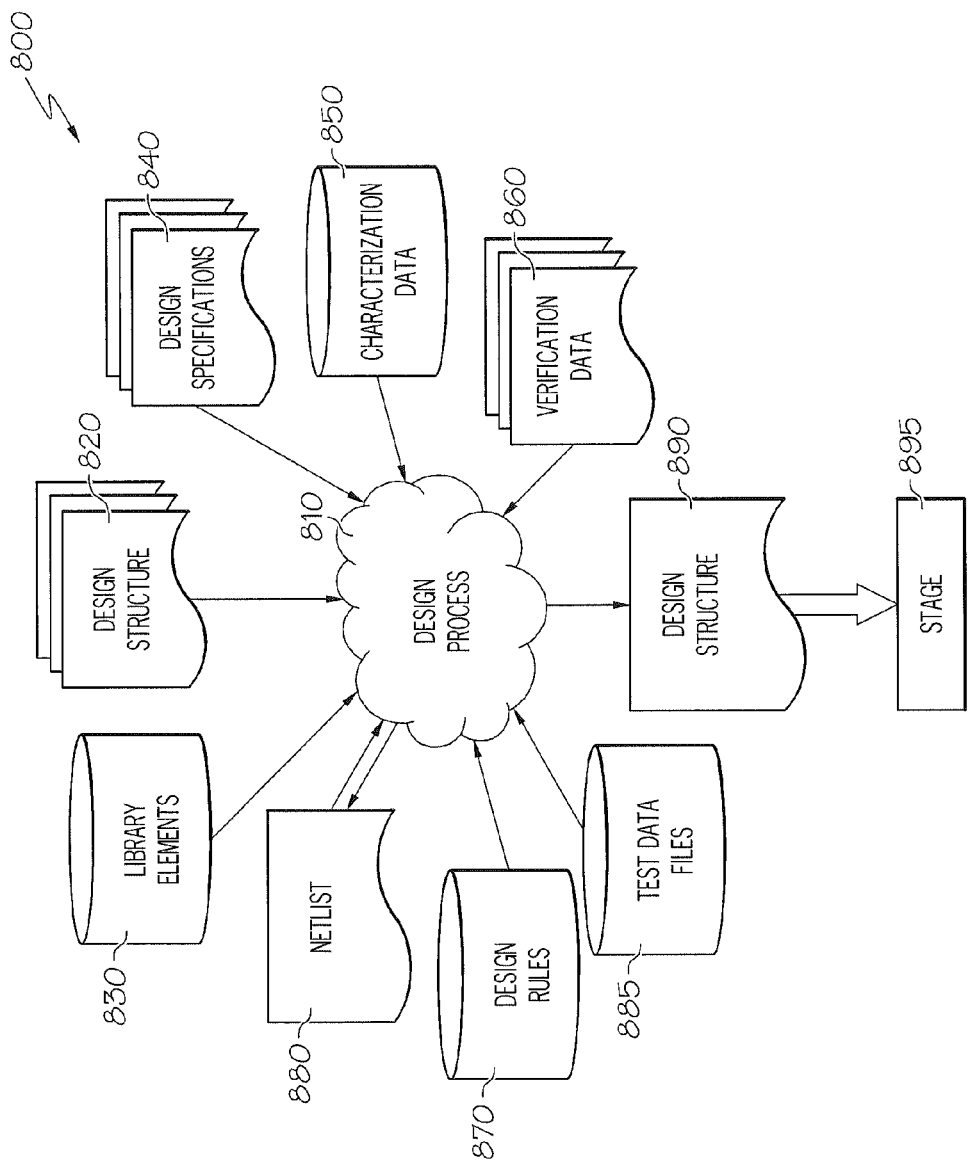
FIG. 8 is a flow diagram of a design process used in semiconductor design, manufacture, and/or test.

FIG. 8 shows a block diagram of an exemplary design flow 800 used for example, in semiconductor IC logic design, simulation, test, layout, and manufacture. Design flow 800 includes processes and mechanisms for processing design structures or devices to generate logically or otherwise functionally equivalent representations of the design structures and/or devices described above and shown in FIGS. 1-7. The design structures processed and/or generated by design flow 800 may be encoded on machine readable transmission or storage media to include data and/or instructions that when executed or otherwise processed on a data processing system generate a logically, structurally, mechanically, or otherwise functionally equivalent representation of hardware components, circuits, devices, or systems. Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA).

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown in FIGS. 1-7. As such, design structure 820 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 810 preferably employs and incorporates hardware and/or software modules for synthesizing, translating, or otherwise processing a design/simulation functional equivalent of the components, circuits, devices, or logic structures shown in FIGS. 1-7 to generate a netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 810 may include hardware and software modules for processing a variety of input data structure types including netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-7. In one embodiment, design structure 890 may comprise a compiled, executable HDL simulation model that functionally simulates the devices shown in FIGS. 1-7.

Design structure 890 may also employ a data format used for the exchange of layout data of integrated circuits and/or symbolic data format (e.g. information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-7. Design structure 890 may then proceed to a stage 895 where, for example, design structure 890: proceeds to tape-out, is released to manufacturing, is released to a mask house, is sent to another design house, is sent back to the customer, etc.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Technical effects include providing a hardware architecture for address-event-representation network simulation. The hardware architecture can be implemented in one or more mesh networks to simulate networks with a large number of interconnected nodes, such as an SNN. Splitting the processing between multiple processing modules and simulating transport delays at nodes that send messages can minimize traffic within the simulated network while maintaining simulation accuracy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A system for address-event-representation network simulation comprising:
    a hardware structure comprised of a plurality of interconnected processing modules configured to simulate a plurality of interconnected nodes, wherein each node comprises:
        a source table configured to receive an input message and identify a weight associated with a source of the input message;
        state management logic configured to update a node state as a function of the identified weight, and generate an output signal responsive to the updated node state; and
        a target table configured to generate an output message in response to the output signal, identify a target to receive the output message, and transmit the output message.

2. The system of claim 1 wherein the address-event-representation network simulation simulates a spiking neural network, the nodes represent neurons, the input message comprises a spike from a source neuron and the output message comprises a spike emitted to a target neuron.

3. The system of claim 1 further comprising:
    an output scheduler configured to receive the output signal from the state management logic, read the target table to determine a delay time, and delay the output signal for the determined delay time before sending the output signal to the target table to trigger transmission of the output message.

4. The system of claim 3 wherein the output scheduler is a shift register configured to place an indicator of the output signal from the state management logic in the shift register and shift the indicator of the output signal at time steps of the address-event-representation network simulation, and further wherein the shift register is configured to delay the output signal until the indicator of the output signal reaches a location of the shift register corresponding to the determined delay time.

5. The system of claim 1 wherein the input message comprises an entry indicator that denotes an entry of the source table to which the input message corresponds, and the output message comprises a pointer to an entry in the source table of a target node and an address identifying the target node that is to receive the output message.

6. The system of claim 1 further comprising:
    learning logic configured to update the weight associated with the source of the input message responsive to a time interval between receiving a pre-output signal and a post-output signal as limited by a time limit, wherein the pre-output signal is associated with the input message and the post-output signal is associated with the output signal.

7. The system of claim 1 further comprising:
learning logic configured to monitor an order in which a pre-output signal and a post-output signal arrive within a learning time window, wherein the pre-output signal is associated with the input message and the post-output signal is associated with the output signal.

8. The system of claim 1 wherein the input message comprises one or more control bits indicating one of a simulation event and an expire event, and the output message comprises one or more control bits indicating one of a simulation event and an expire event.

9. The system of claim 8 further comprising:
a first and second shift register configured to schedule sending the simulation event and the expire event in separate output messages to the target.

10. The system of claim 1 wherein the weight associated with the source of the input message is used to generate a probability value, and the probability value determines whether to update the node state.

11. A method for address-event-representation network simulation, comprising:
receiving an input message at a source table of a node in a hardware structure comprised of a plurality of interconnected processing modules configured to simulate a plurality of interconnected nodes;
identifying a weight associated with a source of the input message, the identified weight located in the source table;
updating a node state as a function of the identified weight, the updating performed by state management logic;
generating an output signal responsive to the updated node state;
accessing a target table to identify a target to receive an output message; and
generating the output message in response to the output signal.

12. The method of claim 11 wherein the address-event-representation network simulation simulates a spiking neural network, the nodes represent neurons, the input message represents a spike from a source neuron and the output message represents a spike emitted to a target neuron.

13. The method of claim 11 further comprising:
receiving the output signal from the state management logic at an output scheduler;
reading the target table to determine a delay time; and
delaying the output signal for the determined delay time before sending the output signal to the target table to trigger transmission of the output message.

14. The method of claim 13 wherein the output scheduler is a shift register configured to place an indicator of the output signal from the state management logic in the shift register and shift the indicator of the output signal at time steps of the address-event-representation network simulation, and further wherein the shift register delays the output signal until the indicator of the output signal reaches a location of the shift register corresponding to the determined delay time.

15. The method of claim 11 wherein the input message comprises an entry indicator that denotes an entry of the source table to which the input message corresponds, and the output message comprises a pointer to an entry in the source table of a target node and an address identifying the target node that is to receive the output message.

16. The method of claim 11 further comprising:
receiving a pre-output signal associated with the input message;
receiving a post-output signal associated with the output signal; and
updating the weight associated with the source of the input message responsive to a time interval between receiving the pre-output signal and the post-output signal as limited by a time limit.

17. The method of claim 11 further comprising:
receiving a pre-output signal associated with the input message;
receiving a post-output signal associated with the output signal; and
monitoring an order in which the pre-output signal and the post-output signal arrive within a learning time window.

18. The method of claim 11 wherein the input message comprises one or more control bits indicating one of a simulation event and an expire event, and the output message comprises one or more control bits indicating one of a simulation event and an expire event.

19. The method of claim 18 further comprising:
scheduling sending the simulation event and the expire event in separate output messages to the target using a first and second shift register.

20. The method of claim 11 further comprising:
generating a probability value from the weight associated with the source of the input message; and
determining whether to update the node state in response to the probability value.

21. A design structure tangibly embodied in a non-transitory machine-readable data storage medium for designing, manufacturing, or testing an integrated circuit, the design structure comprising:
a hardware structure comprised of a plurality of interconnected processing modules configured to simulate a plurality of interconnected nodes, wherein each node comprises:
a source table configured to receive an input message and identify a weight associated with a source of the input message;
state management logic configured to update a node state as a function of the identified weight, and generate an output signal responsive to the updated node state; and
a target table configured to generate an output message in response to the output signal, identify a target to receive the output message, and transmit the output message.

22. The design structure of claim 21, wherein the design structure comprises a netlist.

23. The design structure of claim 21, wherein the design structure resides on storage medium as a data format used for the exchange of layout data of integrated circuits.

24. The design structure of claim 21, wherein the design structure resides in programmable logic.

* * * * *